United States Patent [19]

Hedrich et al.

[11] 4,391,529

[45] Jul. 5, 1983

[54] APPARATUS FOR MIXING AND DEGASSING COMPONENTS OF SYNTHETIC RESINS, PARTICULARLY THERMO-SETTING SYNTHETIC RESINS

[75] Inventors: Wilhelm Hedrich, Ehringshausen; Heinz Krumm, Sinn; Erhard Haeuser, Schoeffengrund, all of Fed. Rep. of Germany

[73] Assignee: Wilhelm Hedrich Vakuumanlagen GmbH & Co. KG, Ehringshausen, Fed. Rep. of Germany

[21] Appl. No.: 281,524

[22] Filed: Jul. 8, 1981

[30] Foreign Application Priority Data

Jul. 12, 1980 [DE] Fed. Rep. of Germany ....... 3026492

[51] Int. Cl.³ .............................................. B01F 5/12
[52] U.S. Cl. ..................................... 366/266; 366/177; 366/317
[58] Field of Search .............. 366/266, 603, 293, 295, 366/302, 306, 307, 318, 184, 150, 143, 294, 296, 81, 300, 304, 309, 311, 315, 317; 222/459

[56] References Cited

U.S. PATENT DOCUMENTS

| | | | |
|---|---|---|---|
| 204,635 | 6/1878 | Underwood | 366/227 |
| 400,807 | 4/1889 | Toepfer | 366/266 |
| 1,048,888 | 12/1912 | Rowlandson | 366/295 X |
| 1,445,935 | 11/1917 | Daman et al. | 366/315 X |
| 1,466,499 | 6/1922 | Fletcher | 366/318 X |
| 1,992,959 | 2/1931 | Mason | 366/227 X |
| 3,445,090 | 5/1969 | Lodige et al. | 366/295 X |
| 4,045,185 | 10/1977 | Azeman et al. | 366/309 X |
| 4,049,244 | 9/1977 | Hedrich | 366/143 |

Primary Examiner—Harvey C. Hornsby
Assistant Examiner—Shewen Bian
Attorney, Agent, or Firm—Flynn, Thiel, Boutell & Tanis

[57] ABSTRACT

An apparatus for mixing and degassing components of synthetic resins includes an evacuatable, cylindrical, downwardly tapering container, a worm conveyor centrally, rotatably supported in the container and a drive mechanism therefor, a cylindrical guide tube closely surrounding the worm conveyor, agitating arms secured to the lower end of the worm conveyor and extending outwardly and upwardly adjacent the walls of the container, and collecting arms secured to the lower end of the guide tube and extending outwardly and upwardly adjacent the agitating arms, each collecting arm having a collecting opening therein which faces opposite the direction of rotation of the agitating arms and is in communication with the interior of the guide tube. Each collecting arm preferably has a plurality of upright baffle members mounted thereon.

13 Claims, 8 Drawing Figures

Fig. 2
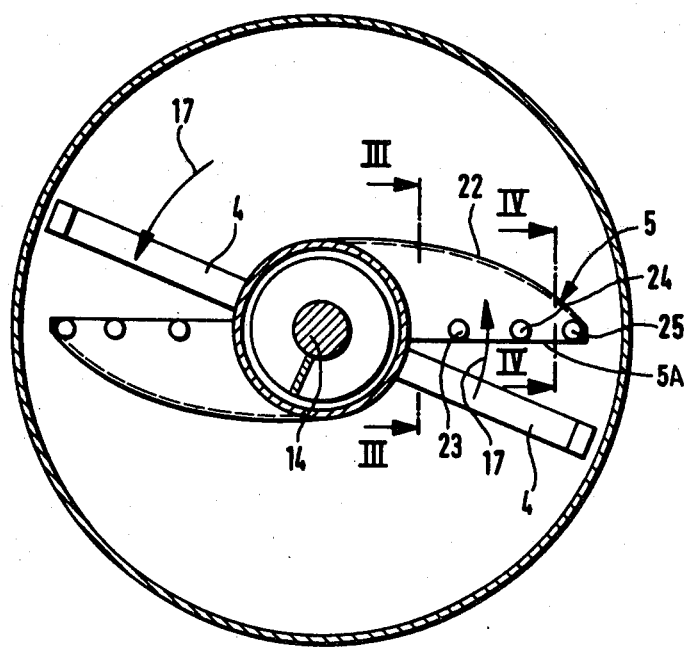
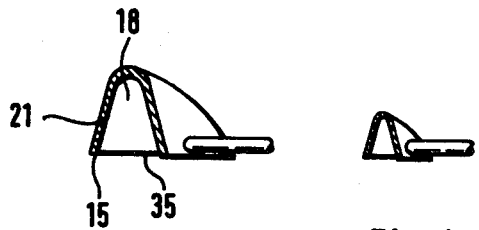
Fig. 3       Fig. 4

APPARATUS FOR MIXING AND DEGASSING COMPONENTS OF SYNTHETIC RESINS, PARTICULARLY THERMO-SETTING SYNTHETIC RESINS

CROSS-REFERENCE TO RELATED APPLICATION

This application is related to a co-pending application entitled "APPARATUS FOR MIXING AND DEGASSING COMPONENTS OF SYNTHETIC RESINS, PARTICULARLY THERMOSETTING SYNTHETIC RESINS", Ser. No. 281,280, filed concurrently herewith.

FIELD OF THE INVENTION

This invention relates to an apparatus for mixing and degassing components of synthetic resins and, more particularly, to such an apparatus which includes an evacuatable, cylindrical, downwardly tapering container in which is centrally arranged a rotatable worm conveyor surrounded with a small spacing by a guide tube, which guide tube has at its top a discharge plate, and includes between the lower end of the guide tube and the container agitating arms which extend with a radial component and are preferably secured to the worm conveyor.

BACKGROUND OF THE INVENTION

When processing synthetic resins, an intense mixing and degassing must often take place before the resin can be cast. This is particularly true for thermosetting casting resins and their components. The mixing often serves the further purpose of evenly distributing fillers in the synthetic resin. The viscosity of the mixture can typically vary within wide limits.

In the case of a mixer of the above-mentioned type, the speed of rotation of the worm conveyor must be sufficiently high that the container content is moved upwardly along the worm conveyor. In the case of relatively viscous mixtures, relatively low speeds of the worm conveyor are sufficient. The thinner the container content, the higher the rotational speed required of the worm conveyor in order to obtain the requisite conveying rate. When the agitating arms are fixedly connected to the worm conveyor, their speed corresponds with the speed of the worm conveyor. The agitating arms take the container content along in their direction of rotation, so that the container content is rotated.

A consequence of the rotation of the container content is that a surface is produced on the container content which is funnel-shaped. This surface differs more or less in shape from a paraboloid of revolution as a result of the friction at the container walls and due to the conveying of material by the worm conveyor. The thinner and less viscous the container content, the more distinct the resulting funnel-shaped distribution of the material, mainly due to the high speed of the agitating arms and also due to the relatively small friction within the material.

The funnel-shaped distribution is effected by centrifugal forces and can, at a low fill level, result in the worm conveyor no longer conveying any material upwardly, since its lower end is no longer sufficiently flooded. This can result, for small fill levels, in the material no longer being circulated across the discharge plate. As a help, mixers have been constructed which permit an uncoupling between the worm and agitating arms. After uncoupling, the agitating arms stand still, so that a funnel-shaped distribution no longer takes place. This makes it possible to circulate the material over the discharge plate, but at the expense of increased structural complexity, more complicated operation of the apparatus and the associated risk of operator errors, and possible degradation of the mixing after the agitating arms are uncoupled.

A basic purpose of the invention, therefore, is to construct an apparatus of the above-mentioned type which has rotating agitating arms and is capable of mixing small levels of fill satisfactorily and circulating the mixture over the discharge plate.

SUMMARY OF THE INVENTION

This purpose is attained according to the invention by providing at least one collecting arm which projects outwardly from the guide tube, extends above and adjacent the agitating arms a small distance from the container wall, and has a collecting opening which faces opposite the direction of rotation of the agitating vanes.

With the inventive apparatus, it is possible to collect material from the areas of the container which lie above the lower inlet end of the worm, particularly material which has been moved in the direction of the container wall by centrifugal forces to provide the funnel-shaped distribution. The invention permits, for small fill levels, an intensive mixing and thorough degassing. These functions are improved in comparison to a container having agitating arms which can be switched off, since the agitating action is maintained throughout the operation. Operating errors are less likely, since one must neither fear that uncoupling or recoupling of the agitating arms has been forgotten. Further, the mentioned advantages are achieved with a structurally simple apparatus. The cost of construction is, in spite of the improved operation, less than the cost of constructing a mixer with agitating arms that can be uncoupled. The small cost of construction is also due in part to the fact that the collecting arms are stationary structural parts.

The invention can be realized with a single collecting arm, but it is also possible to provide several collecting arms. Generally, an arrangement with two collecting arms is preferred. Various cross-sectional shapes are possible for the collecting arms. One preferred embodiment has a collecting arm with a generally V-shaped cross section which tapers in cross-sectional size toward its outer end.

The collecting arms are preferably arranged in the tapered area of the container. However, collecting arms are also possible which lie above the tapered area, particularly in cases where the tapered portion is relatively short. The length of the collecting arms depends also on the use of the apparatus. If the apparatus is to be used for relatively viscous materials, shorter collecting arms are sufficient, whereas if a mixer is to be used for relatively nonviscous materials, longer collecting arms are used.

The collecting arms preferably extend, starting out from the lower end of the guide tube, upwardly. However, this arrangement is not absolutely necessary if they extend, starting out from the collecting opening, horizontally or even inclined. The horizontal arrangement or the arrangement which falls toward the guide tube has the advantage that no incline must be overcome, which is possible at all only due to the energy of movement which is in the material.

In a preferred embodiment, each collecting arm has a collecting opening which communicates with the interior of the guide tube at a location spaced above the bottom of the guide tube a distance greater than or equal to the pitch height of the worm conveyor. In this manner, it is assured that the larger part of the material which is collected by the collecting arms is conveyed upwardly by the worm conveyor.

In a further development of the preferred embodiment, the material entering the guide tube from the collecting arms is directed in a direction opposite the direction of rotation of the worm conveyor, which has the advantage that the energy of movement of the collected material is utilized to move it upwardly along the worm spiral, thereby improving the conveying action.

According to a further advantageous development of the invention, the collecting arms are carriers for upwardly projecting baffle members. In a container which has agitating arms arranged near its bottom, baffle members which project upwardly from below have not previously been used. Also, downwardly projecting baffle members cannot be mounted easily, because of the discharge plate across which the resin lifted by the worm conveyor passes, which discharge plate is preferably a large surface to facilitate the degassing action.

According to the invention, baffle members are secured by means of the collecting arms on the stationary guide tube for the worm conveyor. Such baffle members are advantageous for the mixing operation and contribute to the reduction of the funnel-shaped distribution, since the baffle members form a stationary resistance in the material which is being circulated and thereby slow down the speed of rotation of the material, thus reducing the centrifugal forces which effect the funnel-shaped distribution in the first place.

In the case of relatively short collecting arms, it is possible to mount extensions on the collecting arms which serve as carriers for the baffle members and do not have a collecting function.

BRIEF DESCRIPTION OF THE DRAWINGS

Three exemplary embodiments of the invention are illustrated in the drawings, in which:

FIG. 2 is a horizontal cross-sectional view taken along the line II—II of FIG. 1;

FIG. 3 is a cross-sectional view of a collecting arm taken along the line III—III of FIG. 2;

FIG. 4 is a cross-sectional view of the same collecting arm taken along the line IV—IV of FIG. 2;

DETAILED DESCRIPTION

Figure 1:
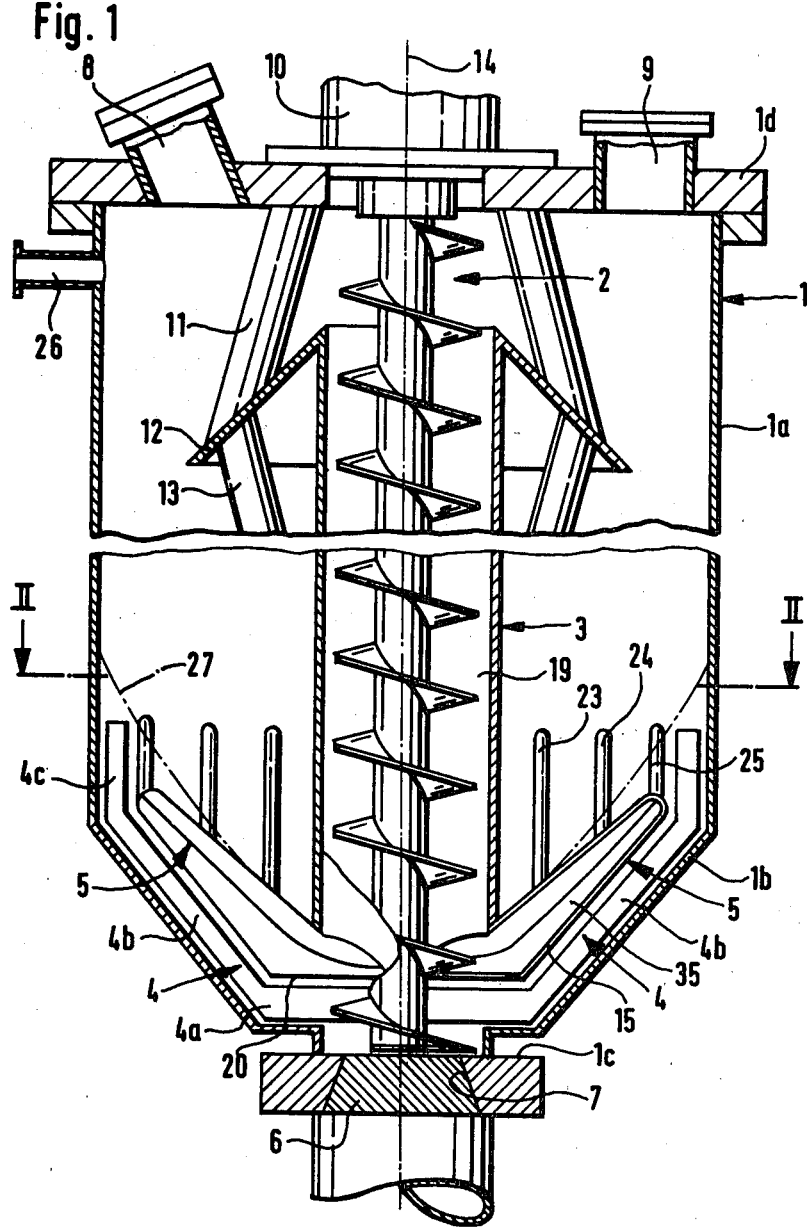
FIG. 1 is a vertical cross-sectional view of a mixer embodying the present invention.

The mixer according to FIGS. 1 to 4 consists substantially of a container 1, a worm conveyor 2 which is arranged vertically within the container 1, a guide tube 3 which coaxially surrounds the worm conveyor 2 and is spaced slightly therefrom, agitating arms 4 which are fixedly connected to the lower end of the worm conveyor 2 and collecting arms 5 which are fixedly connected to the lower end of the guide tube 3. The character and cooperation of these parts will be described in detail hereinafter.

The container 1 has a cylindrical upper part 1a, a frustum-shaped lower part 1b, a bottom 1c and a lid 1d. The bottom 1c has a valve in its center comprising a closing member 6 which cooperates with a valve seat 7 provided in the container bottom 1c. The valve is operated in a conventional and not-illustrated manner.

The lid 1d has two pipe connections 8 and 9 through which resin components can be supplied to the container 1. A drive mechanism 10 is arranged in the center of the lid 1d, which drive mechanism 10 effects rotation of the worm conveyor 2. The worm conveyor 2 is supported by the drive mechanism 10.

The guide tube 3 is secured to the underside of the lid 1d by supporting bars 11. The supporting bars 11 are secured to a plate 12 of conical frustum shape, the edges of the central opening of which are connected to the edges of the upper end of the tube 3. In order to create a rigid connection between the plate 12 and the tube 3, brace bars 13 extend between and are secured to these parts.

The worm conveyor 2 projects downwardly beyond the lower end of the guide tube 3 a distance approximately equal to one worm spiral. The two agitating arms 4 are offset 180° from one another and are secured to the worm conveyor 2 adjacent the lower end thereof. The agitating arms 4 are adapted in shape to the shape of the container, each having a horizontally extending part 4a, an upwardly inclined part 4b which is parallel to and adjacent the inclined area 1b of the container, and a vertically extending part 4c which is parallel to and adjacent the cylindrical part 1a of the container. The agitating arms 4 are thus spaced only a small distance from the container walls.

According to the invention, two collecting arms 5 are provided on the guide tube 3. The two collecting arms 5 are symmetrical with respect to each other about the axis of the shaft 14 of the worm conveyor 2. As shown in FIG. 1, the collecting arms 5 extend approximately parallel to the inclined parts 4b of the agitating arms 4 and are spaced only a small distance from the agitating arms 4, so that the lower edges 15 of the collecting arms 5 are also spaced only a relatively small distance from the conical wall portion 1b of the container 1.

The collecting arms 5 taper in cross-sectional size from the point of attachment to the tube 3 outwardly, as one can see from the top view of FIG. 2 and the two cross-sectional views of FIGS. 3 and 4. The arms 5 have cross sections which are approximately V-shaped, the apex of the V being slightly rounded. The collecting arms 5 are oriented so that collecting openings 35 therein face opposite the direction of rotation of the agitating arms 4, which direction is indicated by the arrow 17 in FIG. 2.

The cavity 18 within each arm 5 communicates with the interior 19 of the tube 3. Specifically, the collecting arms 5 are mounted in openings provided in the lower part of the tube 3, so that the cavities 18 communicate with the interior of the tube 3 above the lower edge 20 of the tube 3.

As shown in FIGS. 2 and 3, the front edges 5A of the arms 5 including the lower edge 15 thereof, are formed so that they lie in a vertical radial plane. The backside 22 of the collecting arm 5 is curved to effect the mentioned tapering.

Three vertical bars 23, 24 and 25 are arranged on each collecting arm 5 near the upper front edge thereof. These bars act as stationary baffle members which improve mixing of the container content and which slow down the rotation of the container content.

A connection 26 for connecting a conventional evacuating or suction pipeline is provided at and communicates with the upper end of the container 1.

The mixing apparatus operates as follows. To start a mixing operation, material is supplied through the pipe connections 8 and 9, which material might, for example, be two different components of a casting resin. Also, at least one filler can be fed in. Then, the pipe connections 8 and 9 are closed off vacuum-tight and gas which is contained in the container is sucked off through the suction connection 26. The worm conveyor 2 is rotationally driven by the drive mechanism 10. Together with the worm conveyor 2 rotate the agitating arms 4. The worm conveyor 2 moves the container content upwardly to the top of the tube 3, after which the material runs off downwardly across the conical discharge plate 12, effecting a spreading out of the container content and thus a good degassing thereof.

Especially during processing of very liquidy resins, the speed of the worm conveyor 2 must be selected to be high, in order to be able to convey the material upwardly to the discharge plate 12. Due to the connection of the agitating arms 4 to the worm conveyor 2, the agitating arms 4 rotate at the worm conveyor speed, as a consequence of which the material in the container receives a relatively high rotational speed. The centrifugal forces which act on the material effect a funnel-shaped distribution, as is indicated by the dashed line 27 in FIG. 1. If the fill level is low, without the collecting arms 5 a condition would occur in which the lower end of the worm conveyor 2 is no longer sufficiently flooded so that it can convey material upwardly. However, due to the collecting arms 5 which project into the material pressed against the container walls by centrifugal forces, the material is collected and is fed to the lower end of the worm conveyor 2. Through this, it is possible to maintain the conveying action of the worm conveyor 2 even in the case of a small fill level and/or a low viscosity of the material.

The stationary baffle members 23, 24 and 25 brake the rotation of the material and thereby contribute to a reduction of the funnel-shaped distribution. The baffle members 23, 24 and 25 also effect a good stirring in of fillers, particularly light fillers which otherwise would have a tendency to float on the synthetic resin material.

Figure 5:
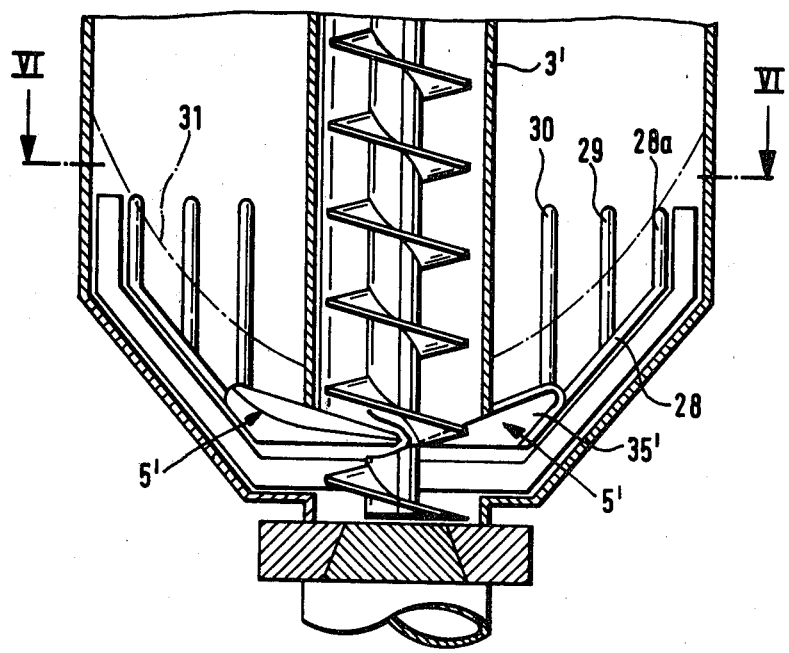
FIG. 5 is a vertical cross-sectional view of a second embodiment of the mixer of FIG. 1.
Figure 6:
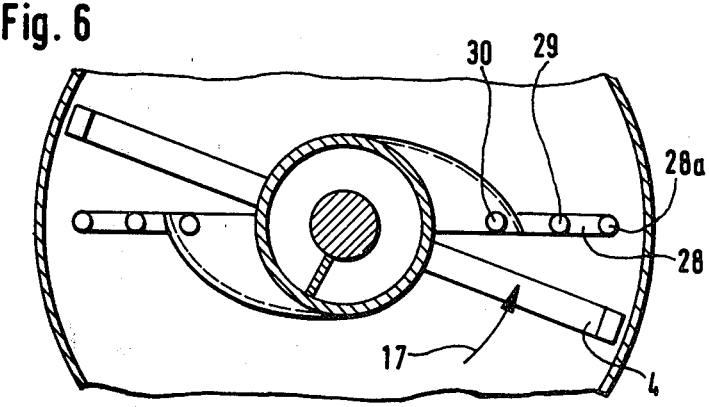
FIG. 6 is a horizontal cross-sectional view taken along the line VI—VI of FIG. 5.

The embodiment according to FIGS. 5 and 6 corresponds substantially with the previously described embodiment. The primary difference is that the collecting arms, which are here identified with reference numeral 5', are substantially shorter than the arms 5 of FIGS. 1 to 4. The collecting arms 5' each extend outwardly only about one-half of the length of the greatest container radius. An inclined, upwardly projecting supporting bar 28 is secured to the end of each collecting arms 5' and has an end portion 28a which extends vertically upwardly. A bar 29 is secured on the bar 28 and extends upwardly parallel to the end 28a, and a further vertical bar 30 is secured directly on the collecting arm 5'. The bars 28a, 29 and 30 act as stationary baffle members, similar to the bars 23, 24 and 25 of FIG. 1. Special supporting bars 28 are not needed in the embodiment according to FIGS. 1 to 4, because there the collecting arms 5 themselves reach sufficiently far outwardly.

The apparatus according to FIGS. 5 and 6 is designed for processing materials which are more viscous than materials which can be processed with the mixer according to FIGS. 1 to 4. The surface of the material during the mixing operation assumes the shape indicated in FIG. 5 by the dashed line 31.

Figure 7:
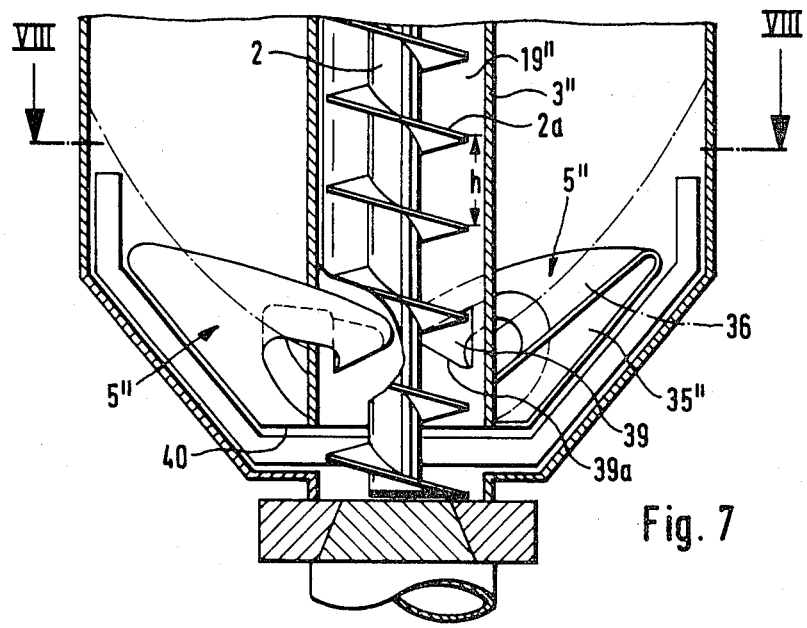
FIG. 7 is a vertical cross-sectional view of a third embodiment of the mixer of FIG. 1.
Figure 8:
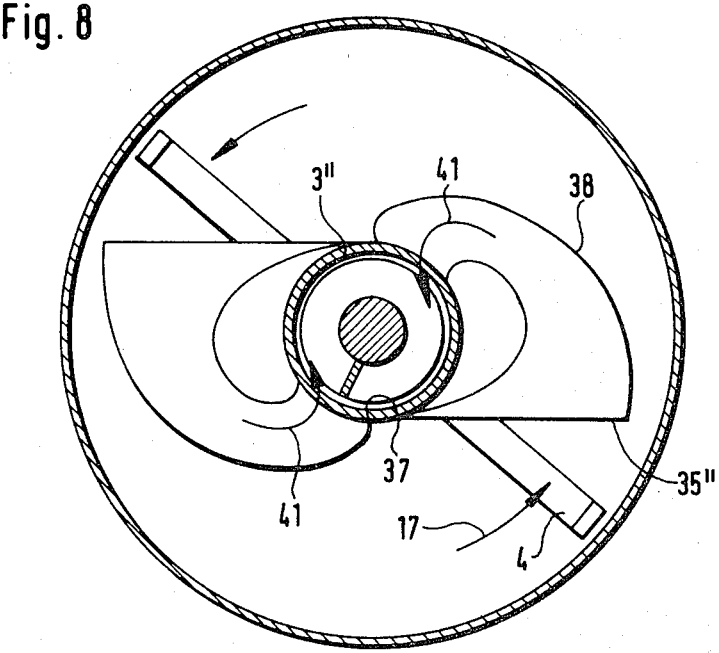
FIG. 8 is a horizontal cross-sectional view taken along the line VIII—VIII of FIG. 7.

In the embodiment according to FIG. 7, the collecting arms, which are here identified with reference numeral 5", are tubelike. Behind a collecting opening 35", which is shaped similar to the opening 35 in the embodiment according to FIGS. 1 to 4, there is a channellike cavity 36 which is curved so that the end 37 (FIG. 8) thereof remote from the collecting opening 35" is oriented to extend approximately in a direction which is opposite the direction of rotation of the worm conveyor 2, the direction of rotation of the worm conveyor 2 and agitating arms 4 being designated by arrow 17.

The cavity 36 in each collecting arm 5" communicates with the interior 19" of the guide tube 3" through a window 39 provided in the guide tube 3" and spaced slightly from the lower end 40 thereof. The distance of the window 39 from the lower end of the tube 3" is preferably approximately equal to the pitch height or lead h of the worm conveyor 2.

Due to the curvature of the channel 38, the material therein flows into the guide tube 3" in a direction corresponding with the arrows 41. The kinetic energy of this material effects to an extent an upward flow thereof on the worm spiral 2a, since the flow occurs in the pitch direction of the worm spiral and the pitch direction is opposite the direction of movement of the worm conveyor.

By arranging the window 39 so as to be spaced from the lower end 40 of the tube 3", it is achieved that as little as possible of the collected material leaves the guide tube 3" in a downward direction. The spiral of the worm conveyor 2 namely effectively forms a seal or obstruction to downward movement of the material. If the lower edge 39a of the window 39 is spaced from the tube end 40 a distance greater than the pitch height h of the worm spiral 2a, the downward obstruction is assured during each position of the worm conveyor 2 during its rotation. This structural relationship is not present in the illustrated embodiment. The illustrated elevational position of the window 39 is, however, sufficient for a relatively good seal or obstruction.

Although particular preferred embodiments of the invention have been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. In an apparatus for mixing and degassing components of synthetic resins, comprising an evacuatable, chamber means having a top wall, a cylindrical wall structure and a downwardly and inwardly tapered conical wall structure and a bottom wall structure at the lower end thereof, means defining an opening into said chamber means for facilitating an evacuation of said chamber means, a rotatable worm conveyor centrally arranged in said chamber means and closely surrounded by an elongated vertically upstanding guide tube, the ends of which are spaced from the top and bottom walls of said chamber means, securement means for fixedly securing said guide tube to said chamber means, said guide tube having at its top end a discharge plate, and including between the lower end of said guide tube and said conical wall structure of said container at least one radially extending agitating arm secured to said worm conveyor at the lower end thereof, the improvement comprising wherein at least one collecting arm is secured to and projects radially from said guide tube, said collecting arm extending above said agitating arm, is spaced a small distance from said wall structures of said chamber means, and has means defining a collecting opening which faces in a direction opposite the direction of rotation of said agitating arm, and means defining an opening connecting an interior cavity in said collecting arm to the interior of said guide tube.

2. The apparatus according to claim 1, including two said agitating arms and two said collecting arms which are arranged symmetrically about the axis of said guide tube and located at the lower end of said guide tube.

3. The apparatus according to claim 1 or claim 2, wherein said collecting arm has a substantially V-shaped cross section taken in a plane parallel to the axis of said worm conveyor and spaced radially outwardly therefrom, the apex of the cross section being rounded.

4. The apparatus according to claim 1 or claim 2, wherein said collecting arms each taper towards their outer ends so that the inside cross sections thereof become smaller toward the outside, and wherein the edge of said collecting opening lies in a vertical plane which contains the axis of said guide tube.

5. The apparatus according to claim 1 or claim 2, wherein said collecting arms are arranged in the area of the tapering of said conical wall structure of said chamber means.

6. The apparatus according to claim 1 or claim 2, wherein each collecting arm extends radially a distance equalling a majority of the largest radius of said container.

7. The apparatus according to claim 1 or claim 2, wherein each collecting arm extends radially a distance which is generally half of the largest radius of said chamber means.

8. The apparatus according to claim 1 or claim 2, wherein the collecting arms project radially from the lower end of said stationary guide tube and extend upwardly and outwardly therefrom.

9. The apparatus according to claim 1 or claim 2, wherein each collecting arm terminates at said means defining an opening in said guide tube located above the lower end of said guide tube.

10. The apparatus according to claims 1 or 2, including plural upwardly projecting baffle members arranged on said collecting arm.

11. The apparatus according to claim 7, including a radially extending extension means provided on collecting arm supporting a carrier for plural upwardly projecting baffle members.

12. The apparatus according to claim 9, wherein the distance of the lower edge of said means defining an opening from the lower end of said guide tube is equal to or greater than the pitch height of said worm conveyor.

13. The apparatus according to claim 9, wherein said cavity which is arranged behind said collecting opening of said collector arm is curved and is directed opposite the direction of rotation of said worm conveyor at its end which is remote from said collecting opening and communicates with the interior of said guide tube.

* * * * *